United States Patent
Hammond et al.

(10) Patent No.: US 6,940,396 B2
(45) Date of Patent: Sep. 6, 2005

(54) CONCURRENT PHASE COMMUNICATION IN TWACS

(75) Inventors: Benjamin A. Hammond, Creve Coeur, MO (US); John B. Hessling, Jr., Maryland Heights, MO (US); Krister Lagerstrom, St. Charles, MO (US)

(73) Assignee: Distribution Control Systems, Inc., Hazelwood, MO (US)

( * ) Notice: Subject to any disclaimer, the term of this patent is extended or adjusted under 35 U.S.C. 154(b) by 255 days.

(21) Appl. No.: 10/430,786

(22) Filed: May 6, 2003

(65) Prior Publication Data

US 2004/0222698 A1 Nov. 11, 2004

(51) Int. Cl.⁷ .............................................. H04M 11/04
(52) U.S. Cl. ................................................. 340/310.02
(58) Field of Search ..................... 340/310.01–310.08, 340/2.1, 2.7; 375/257–259

(56) References Cited

U.S. PATENT DOCUMENTS

| | | |
|---|---|---|
| 4,516,079 A | 5/1985 | York |
| 4,658,238 A | 4/1987 | Mak |
| 4,914,418 A | 4/1990 | Mak et al. |
| 4,918,422 A | 4/1990 | Mak |
| 4,963,853 A | 10/1990 | Mak |
| 4,996,513 A | 2/1991 | Mak et al. |
| 5,262,755 A | 11/1993 | Mak et al. |
| 5,486,805 A | 1/1996 | Mak |
| 5,933,072 A * | 8/1999 | Kelley ................... 340/310.01 |
| 6,278,357 B1 | 8/2001 | Croushore et al. |
| 2002/0097805 A1 * | 7/2002 | Casper et al. ................ 375/257 |

* cited by examiner

*Primary Examiner*—Jeffery Hofsass
*Assistant Examiner*—George A Bugg
(74) *Attorney, Agent, or Firm*—Polster, Lieder, Woodruff & Lucchesi

(57) ABSTRACT

A method for concurrently communicating over each phase of an electrical power distribution network (N). A first outbound signal (SO1) is transmitted over one phase (AN-A) of a bus (S) by an outbound modulation unit. The unit is released as soon as the first outbound signal (SO1) is transmitted so the unit can transmit a second outbound signal (SO2) over a second phase (BN-B or CN-C) of the bus. The second outbound signal is transmitted concurrently with an inbound signal (IB1) sent in response to the first outbound signal (SO1). The unit is again released, as soon as the second outbound signal (SO2) is transmitted, so the unit can transmit a third outbound signal (SO3) over the third phase (BN-B or CN-C) of the bus. This third outbound signal is transmitted concurrently with a second inbound signal (IB2) sent in response to the second outbound signal (SO2). The method allows concurrent communications over all three phases of the network (N).

20 Claims, 2 Drawing Sheets

CONCURRENT PHASE COMMUNICATION IN TWACS

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to the transmission of signals on a multi-phase (3φ) power transmission system using a two-way communications system (TWACS®), and more particularly to the concurrent transmission of data and other information on more than one of the phases.

It is known to transmit and receive messages on an electrical distribution system. Patents teaching a two-way communications system and the techniques employed in two-way communication include U.S. Pat. Nos. 5,696,441, 5,486,805, 5,262,755, 4,996,513, 4,963,853, 4,918,422, 4,914,418, and 4,658,238 all of which are assigned to the same assignee of the present application. In practice, a request for information or data is formulated into an "outbound" message that is injected into one phase of a three-phase power distribution network and transmitted through the network to a remote location such as an electrical meter on a building. The message may, for example, request information such as to the current electrical consumption at the site. A reply, or "inbound" message is then transmitted back over the same phase to the transmission site, which is typically a substation in the power grid comprising the distribution system. When the inbound message is processed, the requested information is then used to measure such things as total demand on the system at that particular time.

TWACS is used in conjunction with various remote devices such as automatic metering reading (AMR) equipment, load control devices and other types of monitoring and control equipment installed throughout the distribution system in homes, factories, office buildings, etc. After installation, each remote device can be accessed through one of six communication paths. A communication path consists of the outbound phase combination of phasor, AN, BN, CN, AB, BC or CA and the inbound return path φA, φB, or φC. The communication path is defined by the electrical connection for each location. After installation, the communications path is determined by the system and recorded for later use. Accordingly, when a series of remote devices, such as meters are in place, some will return an inbound signal on φA, but not a signal on φB or φC; other remote devices will return an inbound signal on φB, but not a signal on φA or φC; and, some remote devices will return an inbound signal on φC, but not a signal on φA or φB.

In the current system, after an outbound message is issued on one phrase combination and while the inbound response is being returned, no other outbound and inbound processing can occur until the inbound processing is completed. The problem this presents is the delay in the transmission and reception of outbound and inbound TWACS signals, and the consequent limiting of the amount of information, which can be sent and received through the system at any one time. If it were possible to be able to concurrently send and receive signals on all three phases, the bandwidth of the communications network would be effectively tripled improving information flow and system response time.

BRIEF SUMMARY OF THE INVENTION

A method for concurrently communicating over all of the phases of an electrical power distribution network. A first outbound signal is transmitted over one phasor of a three-phase bus by an outbound modulation unit. The outbound modulation unit is released as soon as the first outbound signal is transmitted. This allows the unit to now transmit a second outbound signal over another phasor of the bus with the second outbound signal being transmitted concurrently with an inbound signal returned in response to the first outbound signal transmitted over the first phase. The outbound modulation unit is again released, as soon as the second outbound signal is transmitted, so the unit can now transmit a third outbound signal over the third phasor of the bus. This third outbound signal is transmitted concurrently with a second inbound signal, returned in response to the second outbound signal transmitted over the second phase. The method allows concurrent communications over all three phases of the network substantially increasing the communications bandwidth of the network and allowing for faster system response to changes in electrical demand. Further, the method is repeated so long as there are commands to be processed.

In addition, receiver multiplexer assemblies within a substation are wired in parallel so that each receiver assembly at the substation is available for use for concurrent communications. A control and receiving unit of the invention supports this concurrent phase communications capability and allows up to four inbound response signals to be concurrently processed.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings, which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
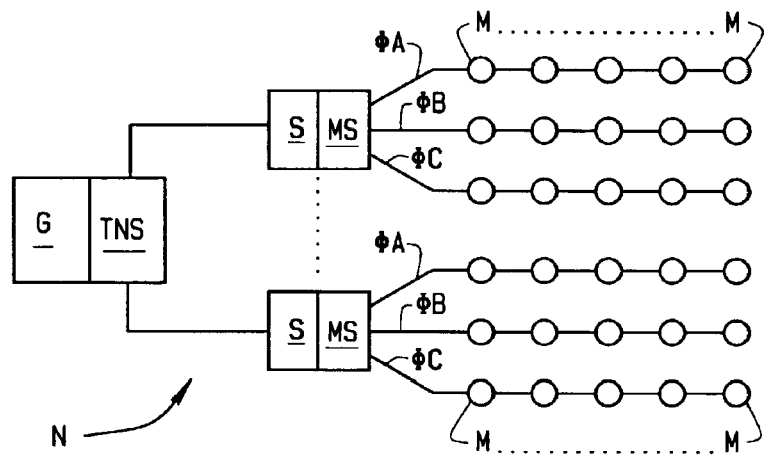
FIG. 1 is a simplified representation of an electrical distribution network.

Referring to the drawings, an electrical power distribution network N includes a power generating plant G whose electrical output is distributed through a series of substations S. Each substation supplies power to a number of homes, office buildings, factories, etc. Each building is equipped with an electrical meter M designed for automatic meter reading or AMR. A two-way communications system 10 of the invention allows each meter to be separately accessed and read with the results reported back to the sub-station and ultimately to the power plant. This allows information to be reported concerning power usage, changes in demand the location of outages, etc. Each substation is equipped with substation communication equipment (SCE) for this purpose. The system employs two-way group addressing, and as shown in FIG. 1, the meters M are generally equally distributed across all three phases. The communication path from substation S to the meters is, for example, line-neutral outbound with phase detection, all as described in the previously referenced patents the teachings of which are incorporated herein by reference. During installation of each meter M, it is programmed to receive an outbound signal (SO) from a substation S on one bus, and to transmit a reply or inbound signal (IB) on the same bus. The outbound signal includes an address unique to the particular meter, together with a request for information such as current power usage. The inbound signal also includes the meter address together with data representing current power usage, for example. Those skilled in the art will understand that other information, requests, and commands can be incorporated in an outbound signal, and a corresponding response in an inbound signal. Those skilled in the art will further understand that all meters programmed to have two-way communications using one phase cannot be corresponded with using one of the other two phases.

As previously noted, heretofore it has been necessary to complete transmitting the outbound signal and receiving the inbound signal on a bus, before transmitting another outbound signal on the same bus. The present invention provides a method and apparatus that allows up to three separate outbound signals and the returning inbound signal to be concurrently processed by the substation communications equipment on the same bus, and up to four separate outbound signals and the returning inbound signals on a substation with more than one bus. As described hereinafter, the system and method of the invention allows for this overlap in the communications on all three phases of a single bus, provided the respective outbound signaling does not interfere with the detection of the inbound response on any phases in use on the same bus.

In accordance with the invention, once a master station MS begins an AMR query cycle, the master station sends commands to a control and receiving unit CRU to be processed. The CRU stores up to 15 commands in a queue, and selects a command to process from this queue. The CRU commands an outbound modulation unit OMU to generate an outbound signal OS1 (see FIG. 3) that is imposed, for example, on line A-N. The OMU has up to six outbound paths over which an outbound signal can be transmitted: lines A-N, B-N, C-N, A-B, B-C, and C-A. The reply signal is returned over the same line. That is, the reply to an AN outbound signal is returned on lines A and N; the reply to a BN outbound signal is returned on lines B and N; and, the reply to a CN outbound signal is returned on lines C and N. Similarly, the reply to an AB outbound signal is returned on lines A and B, the reply to a BC outbound signal is returned on lines B and C, and the reply to a CA outbound signal is returned on lines C and A. An inbound signal pickup unit IPU, which comprises a current transformer, detects and supplies the inbound signal to a correlation receiver and a processor assembly CRPA of the CRU's station communication's processor assembly SCPA. The signal is supplied to the CRPA through a correlation receiver multiplexer assembly CRMA. This assembly provides a 32:1 multiplexing capability, and analog-to-digital (A/D) conversion of the inbound signal.

Figure 3:
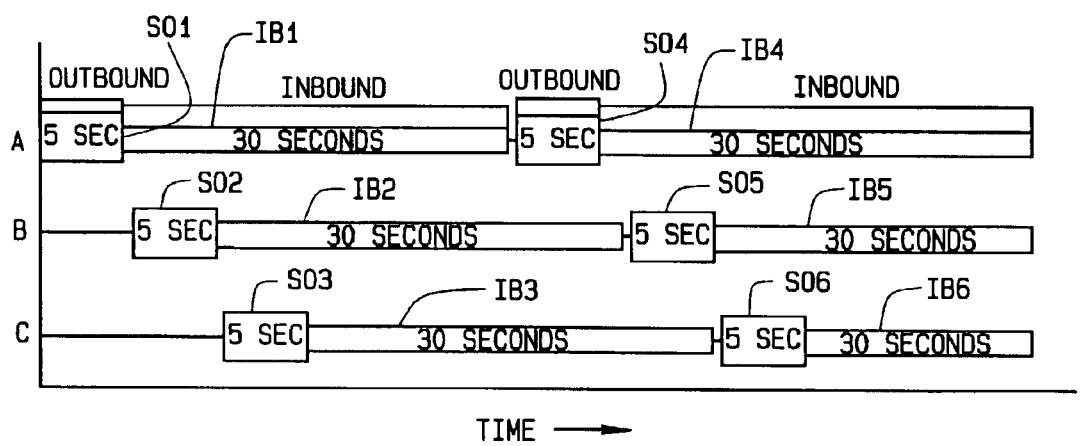
FIG. 3 is a signal flow chart illustrating concurrent phase communication in accordance with the present invention.
Figure 2:
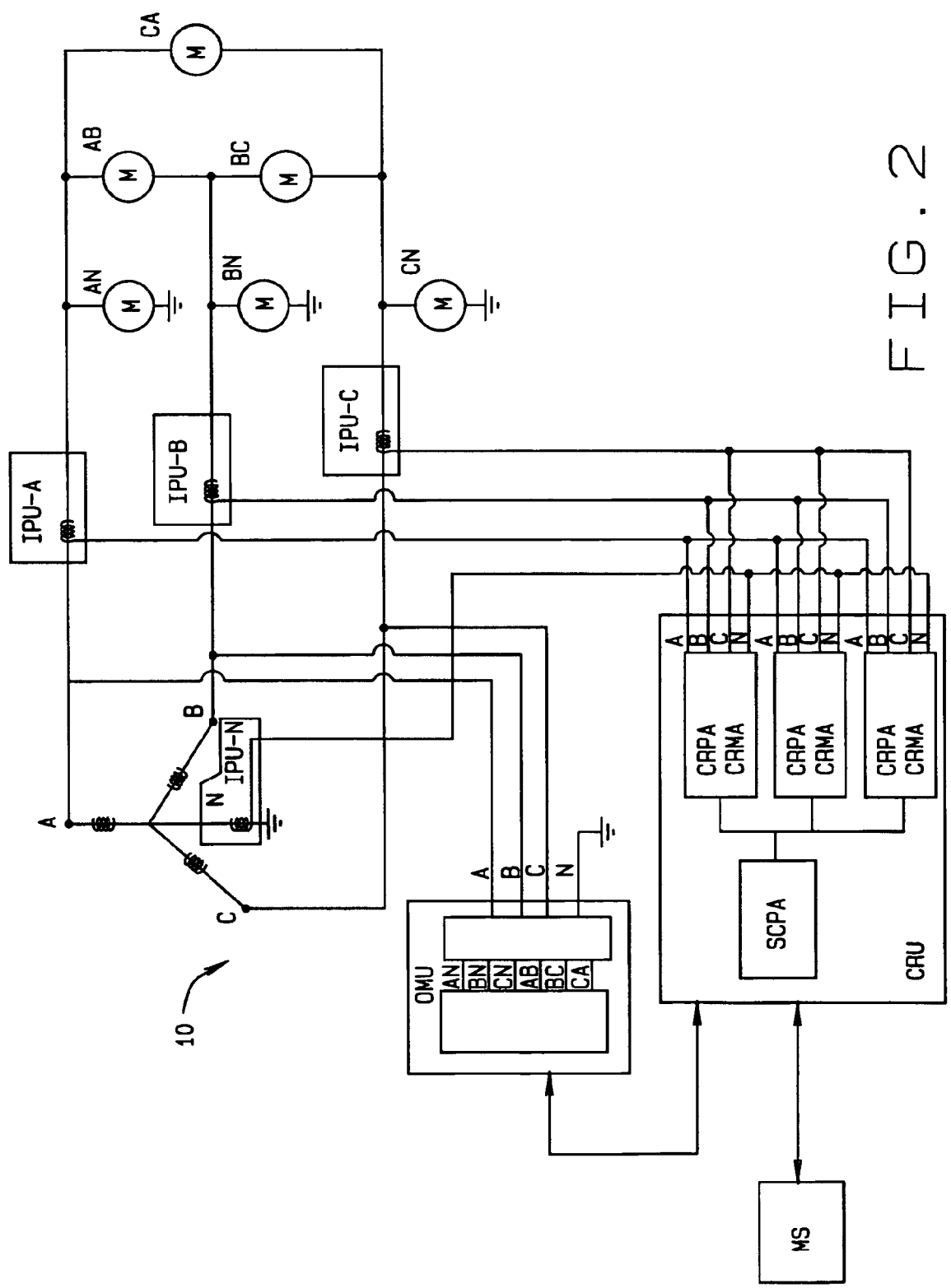
FIG. 2 illustrates a two-way communications system over the network.

As soon as the outbound signal is transmitted on line A-N, the OMU sends an end of message (EOM) signal to the SCE. This allows the OMU to now be released to send another outbound signal. As shown in FIG. 3, while inbound signal IB1 detection is still in progress on the A phase, the SCE selects another signal that can be processed and which does not interfere with processing the previous inbound signal. This new outbound signal can therefore be either a BN, CN, or BC signal. Assuming the SCE starts processing a BN-B signal, the OMU generates and supplies an outbound signal OS2 on line B-N, and the assembly CRPA connected to that line will begin processing the return inbound signal IB2 on phase B.

Again, as soon as the outbound signal is transmitted on line B-N, the OMU again sends an EOM signal to the SCE to effect release of the OMU. The SCE again looks for a command in its queue that can be executed without interfering with the inbound signal processing that is in progress. Now, the outbound signal must be a CN signal because this is the only signal that will not interfere with the two previous inbound signals being received on the lines for phase A and phase B respectively. Once the third outbound signal OS3 is sent, there are now three signals being concurrently processed, and the SCE cannot initiate transmission of another outbound signal SO4–SO6 until processing of the inbound signal response to a previous outbound signal is complete. Once this occurs, the SCE can generate another outbound signal SO4, on line A-N, provided there is a command in the SCE queue for this line.

As shown in FIG. 3, in accordance with the invention, the transmission of outbound signals SO4–SO6 results in inbounds reply signals IB4-IB6 being sent in response. The transmission of outbound signal SO4 and its reply signal IB4 overlaps inbound return signals IB2 and IB3, and so forth. This process will continue so long as the SCE has commands that can be processed in parallel so all three line-neutral phases can run concurrently.

As an example of the timing involved in implementing the system and method of the invention, a typical outbound signal approximately five seconds to transmit. The time for the reply inbound signal is approximately thirty seconds, so the total time for each outbound/inbound cycle is approximately thirty-five seconds.

The importance of the system and method of the invention is that it triples the potential communications bandwidth for electrical distribution network N. The method works with both line-line and line-neutral phases, although the improvement for line-line meters is limited to two times the bandwidth.

Finally, system 10 employs a "shadowing" feature that allows the current transformer CT inputs of the IPU's to be mapped to each of the CRMA's being used in the system. Thus, any IPU input connected to a port on the first correlation receiver multiplexer assembly CRMA will also be connected to the identical port on all other correlation receiver multiplexor assemblies CRMAs that are installed in the CRU. Thus, inputs mapped to one CRMA in the SCE are automatically mapped to the other CRMA's. The resulting IPU shadowing feature is enabled whenever concurrent phase communications is used.

In view of the above, it will be seen that the several objects and advantages of the present invention have been achieved and other advantageous results have been obtained.

Having thus described the invention, what is claimed and desired to be secured by Letters Patent is:

1. In a two-way communications system (10) used with an electrical power distribution network (N), a method for concurrently transmitting and receiving communication signals over each phase of the network comprising:
   transmitting a first outbound signal (SO1) over one phase (AN-A) of a bus by a transmission means (OMU); and,
   as soon as the first outbound signal (SO1) is transmitted, releasing the transmission means to transmit a second outbound signal (SO2) over a second phase (BN-B or CN-C) of the bus, the second outbound signal being transmitted concurrently with an inbound signal (IB1) sent in response to the first outbound signal (SO1), thereby to provide concurrent communications over two phases of the network.

2. The method of claim 1 further including as soon as the second outbound signal (SO2) is transmitted, releasing the transmission means to transmit a third outbound signal (SO3) over a third phase (BN-B or CN-C) of the bus, the third outbound signal being transmitted concurrently with a second inbound signal (IB2) sent in response to the second outbound signal (SO2), whereby there is concurrent communications over all three phases of the network (N).

3. The method of claim 2 further including repeating the steps of claims 1 and 2 so there is ongoing concurrent communications on all three phases of the network (N) thereby to substantially increase the communication's bandwidth of the network.

4. The method of claim 2 in which the transmission means includes an outbound modulation unit (OMU) having six possible output paths (A-N, B-N, C-N, A-B, B-C, C-A) for the three phases with the transmission of the first outbound signal (SO1) restricting the number of output paths available for the second outbound signal, and with the transmission of the second outbound signal further limiting the number of output path available for the third outbound signal.

5. The method of claim 4 further including receiving each inbound signal on a communications path corresponding to the output path over which the respective outbound signal is transmitted.

6. The method of claim 5 further including connecting a receiver means (IPU) in the communications path for receiving an inbound signal.

7. The method of claim 6 further including connecting a receiver means in each communications paths with inputs to the receiver means being connected in parallel for any receiver means to receive an inbound signal on any communications path.

8. In a two-way communications system (10) for an electrical power distribution network (N), a communications method for sending and receiving information over each phase of the network comprising:
   transmitting a first outbound signal (SO1) over a first phase (AN-A) of a power distribution bus (B);
   after the first outbound signal (SO1) has been transmitted, transmitting a second outbound signal (SO2) over a second phase (BN-B or CN-C) of the bus with the second outbound signal being transmitted concurrently with an inbound signal (IB1) sent in response to the first outbound signal (SO1);
   after the second outbound signal (SO2) is transmitted, transmitting a third outbound signal (SO3) over a third phase (BN-B or CN-C) of the bus, the third outbound signal being transmitted concurrently with a second inbound signal (IB2) sent in response to the second outbound signal (SO2), thereby to provide concurrent communications over all three phases of the network (N).

9. The method of claim 8 further including repeating the steps set forth in claim 8 to provide ongoing concurrent communications on all three phases of the network (N) thereby to substantially increase the communication's bandwidth of the network.

10. The method of claim 8 further including receiving each inbound signal on a communications path corresponding to the phase over which the respective outbound signal is transmitted.

11. The method of claim 10 further including connecting a receiver means (IPU) in the communications path for receiving an inbound signal.

12. The method of claim 11 further including connecting a receiver means in each communications paths with inputs to the receiver means being connected in parallel for any receiver means to receive an inbound signal on any communications path.

13. A two-way communications system (10) for an electrical power distribution network (N) for concurrently transmitting and receiving communication signals over each phase of the network comprising:
   a transmitter (OMU) for transmitting a first outbound signal (SO1) over a first phase (AN-A) of a bus (B); and,
   a controller (12) responsive to the transmission of the first outbound signal to release the transmitter from the first phase of the bus, as soon as the first outbound signal (SO1) is transmitted, for the transmitter to transmit a second outbound signal (SO2) over a second phase (BN-B or CN-C) of the bus, the second outbound signal being transmitted concurrently with an inbound signal (IB1), sent over the first phase in response to the first outbound signal (SO1), occurring on the first phase, thereby to provide concurrent communications over two phases of the network.

14. The communications system of claim 13 wherein the controller is further responsive to the transmission of the second outbound signal to release the transmitter from the second phase of the bus, as soon as the second outbound signal (SO2) is transmitted, for the transmitter to transmit a third outbound signal (SO3) over a third phase (BN-B or CN-C) of the bus, the third outbound signal being transmitted concurrently with an inbound signal (IB2), sent over the second phase in response to the second outbound signal (SO2), occurring on the second phase, to provide concurrent communications over three phases of the network.

15. The system of claim 14 further including receiving means (IPU) in each communications path corresponding to the output path over which the respective outbound signal is transmitted, for receiving an inbound signal sent in response to the outbound signal.

16. The system of claim 15 wherein the receiver means are connected in parallel for any receiver means to receive an inbound signal traveling over on any communications path.

17. A two-way communications system (10) for a three-phase electrical power distribution network (N) for concurrently transmitting and receiving communication signals over each phase of the network comprising:
   a transmitter (OMU) for transmitting a first outbound signal (SO1) over a first phase (AN-A) of a bus (B); and, a controller (12) responsive to the transmission of the first outbound signal to release the transmitter from the first phase of the bus, as soon as the first outbound signal (SO1) is transmitted, for the transmitter to transmit a second outbound signal (SO2) over a second phase (BN-B or CN-C), the second outbound signal being transmitted concurrently with an inbound signal (IB1), sent over the first phase in response to the first outbound signal (SO1), occurring on the first phase, thereby to provide concurrent communications over two phases of the network, the controller being further responsive to the transmission of the second outbound signal to release the transmitter from the second phase, as soon as the second outbound signal (SO2) is transmitted, for the transmitter to transmit a third outbound signal (SO3) over the third phase (BN-B or CN-C), the third outbound signal being transmitted concurrently with an inbound signal (IB2), sent over the second phase in response to the second outbound signal (SO2), occurring on the second phase, to provide concurrent communications over three phases of the network.

18. The system of claim 17 further including receiving means (IPU) in each communications path corresponding to the phase over which the respective outbound signal is transmitted, for receiving an inbound signal sent in response to the outbound signal.

19. The system of claim 18 wherein the receiver means includes a multiplexer capable of receiving an inbound signal transmitted over any communications path.

20. The system of claim 19 wherein the receiver means are connected in parallel for any receiver means to receive an inbound signal traveling over on any communications path.

\* \* \* \* \*